United States Patent [19]
Frederick

[11] Patent Number: 4,940,987
[45] Date of Patent: Jul. 10, 1990

[54] AUTOMATIC HORIZONTAL AND VERTICAL SCANNING RADAR

[76] Inventor: Philip R. Frederick, 632 17th Ave., Salt Lake City, Utah 84103-3709

[21] Appl. No.: 303,638

[22] Filed: Jan. 30, 1989

[51] Int. Cl.$^5$ .............................................. G01S 9/66
[52] U.S. Cl. ...................................... 342/26; 342/180
[58] Field of Search .................. 342/26, 180, 176, 182, 342/183

[56] References Cited

U.S. PATENT DOCUMENTS

| | | |
|---|---|---|
| 3,044,058 | 7/1962 | Harris . |
| 3,154,636 | 10/1964 | Schwertz . |
| 3,333,263 | 7/1967 | Kazakevicius et al. . |
| 3,366,951 | 1/1968 | Lhermitte et al. . |
| 3,792,423 | 2/1974 | Becker et al. . |
| 4,684,951 | 8/1987 | Baumer . |

OTHER PUBLICATIONS

Skolnik, "Introduction to Radars Systems", 1980, p. 359, McGraw Hill.
Peters, T. M., "Multi-Planar Transformation of CT Images", Journal de L'Association Canadienne des Radiologistes, vol. 31, pp. 126-128, 1980.
Glenn, W. V. et al., "Image Generation and Display Techniques for CT Scan Data: Thin Transverse and Reconstructed Coronal and Sagital Planes", Investigative Radiology, Sep.-Oct., 1975, pp. 403-416.
Glenn, W. V., Jr., Johnston, R. J., Morton P. E., Owyer, S. J., Further Investigation and Initial Clinical Use of Advanced CT Display Capability, Investigative Radiol 10:479-489, 1975.

Primary Examiner—Thomas H. Tarcza
Assistant Examiner—Mark Hellner
Attorney, Agent, or Firm—Thorpe, North & Western

[57] ABSTRACT

An automatic horizontal and vertical scanning radar for aircraft for displaying weather conditions includes an antenna system mounted in the aircraft for sweeping horizontally and vertically in response to horizontal and vertical drive signals and for transmitting radar signals forwardly of the aircraft and receiving back reflected radar signals, a receiver for digitizing received reflected radar signals, a storage unit for storing the digitized signals, a display unit responsive to display control signals for displaying a plan view image of weather conditions ahead of the aircraft represented by reflected radar signals received by the antenna system sweeping back and forth horizontally and a vertical view image of weather conditions represented by reflected radar signals received by the antenna system moving up and down vertically, and a control unit for supplying horizontal and vertical drive signals to the antenna system, and for producing control signals from the stored digitized signals.

20 Claims, 3 Drawing Sheets

AUTOMATIC HORIZONTAL AND VERTICAL SCANNING RADAR

BACKGROUND OF THE INVENTION

This invention relates to a radar system for use with aircraft, seagoing vessels, ground stations or the like, capable of both automatic horizontal and vertical scanning and display of both horizontal sweep return signals and vertical sweep return signals.

Currently used airborne weather radar systems display radar returns in a plan view only representing weather images as the radar beam sweeps horizontally back and forth ahead of the aircraft. This plan view image does provide an indication of the intensity of a weather condition, such as a storm containing water droplets, in various colors, with the color hue representing the degree of reflectivity. The distance from the object or condition from which a radar echo arose is depicted on the radar display by the relative position on the display from the display location representing the aircraft. That is, a point on the display represents the aircraft, i.e., the radar antenna, and then fanning out from that location horizontally the weather image is developed. All this is well known in the airborne weather radar art.

Weather radar systems do have provision for manually tilting the radar antenna up or down so that radar returns may be taken along sweeps at different elevations. By knowing the angle of elevation of the radar beam, the altitude of the aircraft, and the distance of certain echo returns, a trigonometric calculation or estimate can be made as to the height or heights of weather conditions from which the echoes were reflected. However, when flying in a stormy weather condition, the flight crew is typically preoccupied with other matters such as navigating the aircraft and therefore typically would not have the time to successively manually tilt the radar antenna, make trigonometric calculations, and then determine the height of the various portions of the storm. This is especially true if a stormy weather condition is combined with the need for an instrument approach to an airport.

From the above considerations, it is apparent that some type of automatic vertical presentation of a weather condition, along with the horizontal presentation, would be desirable. Then, the flight crew could view and hopefully interpret such presentations at a glance to make determinations as to the need or desirability of navigating the aircraft to avoid certain areas or taking other navigation precautions.

Automatic vertical and horizontal presentation of weather conditions would also be useful for ground stations, ships and other radar-based environments.

SUMMARY OF THE INVENTION

It is an object of the invention to provide a weather radar system in which both horizontal, plan view representations of weather conditions and vertical, front view or vertical, side view representations of weather conditions can be visually presented on a display device for viewing by a user.

It is also an object of the invention to provide such a display in which elevations of various parts of a weather condition can be readily determined upon viewing.

It is a further object of the invention to provide such a display for use on an aircraft in which the altitude of an aircraft carrying the system can be simply shown on the display to thereby show the aircraft's altitude relative to various parts of the weather condition.

It is still another object of the invention to provide such a system which is simple in operation and easy to use and interpret.

The above and other objects of the invention are realized in a specific illustrative embodiment of an automatic horizontal and vertical scanning weather radar system which includes an antenna section for transmitting a radar beam outwardly and receiving reflected radar signals. The antenna section is responsive to both horizontal drive signals for sweeping the radar beam back and forth horizontally, and to vertical drive signals for moving the radar beam up and down vertically. Transmit signals are automatically and periodically supplied to the antenna section by a radar signal generator such as a magnetron. Receiver circuitry is coupled to the antenna section for digitizing reflected radar signals received by the antenna section and for storing the digitized signals together with the locations in space from which the signals were received. A display device receives digitized signals representing reflected radar signals and produces a plan view image display of weather over a preselected range represented by reflected radar signals received by the antenna section sweeping back and forth horizontally, and a vertical, front view image display of weather over a preselected height represented by reflected radar signals received by the antenna section moving up and down vertically. Alternatively (or additionally) a vertical, side view image display may be developed over a preselected range of distances for reflected radar signals received by the antenna section also moving up and down vertically. A control device or processor supplies horizontal drive signals and vertical drive signals to the antenna section to control movement of the antenna, retrieves digital signals stored by the receiver circuitry and processes and supplies them to the display device, and generally controls the interaction of the other elements of the radar system.

In accordance with one aspect of the invention, the display device includes a receiving screen, such as a cathode ray tube, on one area of which the plan view display is presented and on another area of which the vertical, front view display or vertical, side view display is presented. When the radar system is used on an aircraft, indicia may be inscribed or otherwise provided on the first-mentioned area of the display screen to indicate distances from the aircraft and o the second-mentioned area of the display screen to indicate elevation or altitude. In this manner, distances from the aircraft and altitude of various parts of a weather condition and terrain can be readily ascertained.

In accordance with an additional aspect of the invention, a cursor or carat is provided for display on the second-mentioned area of the display screen to represent the altitude of the aircraft with respect to the vertical view presentation of weather.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
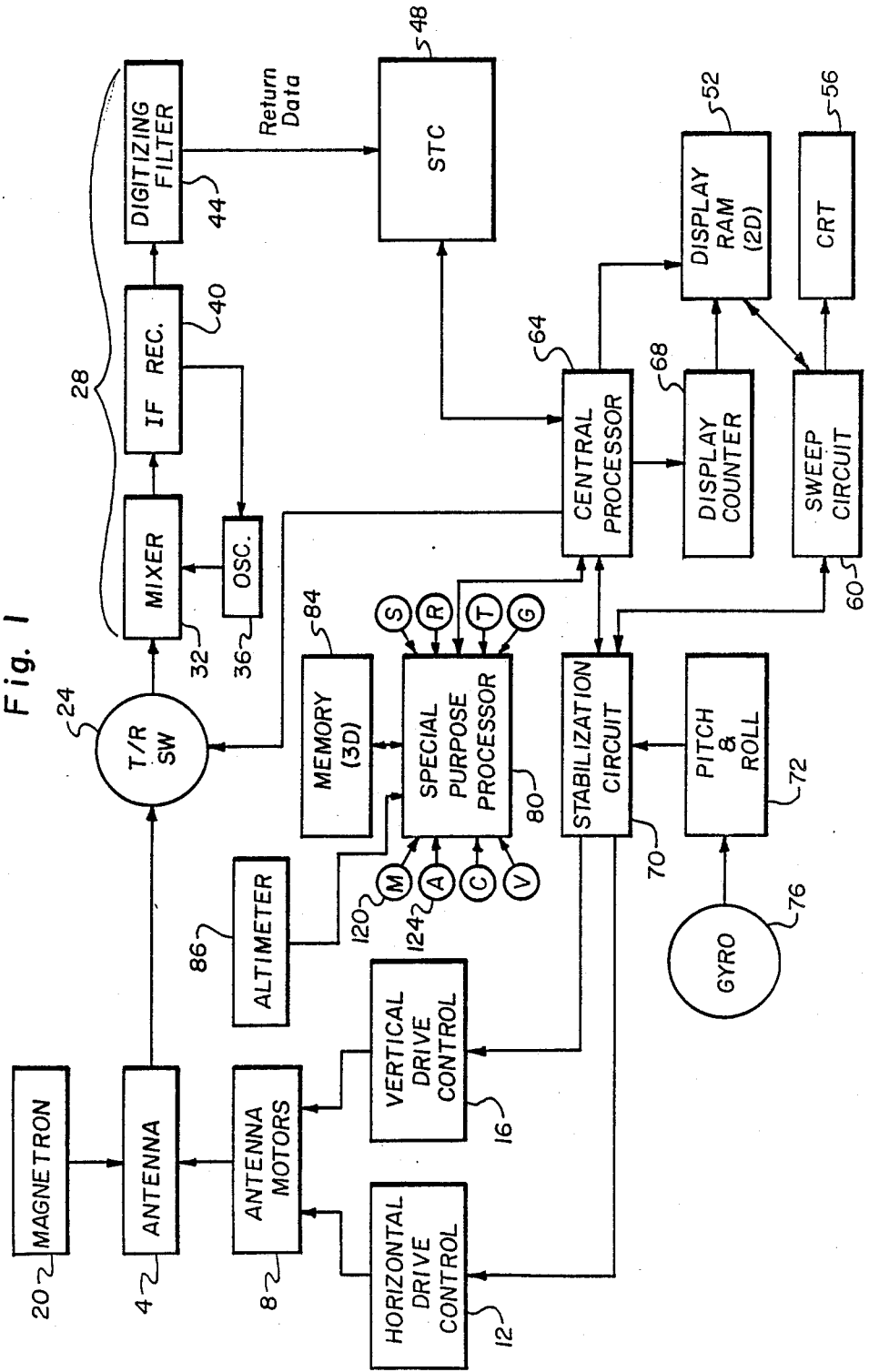
FIG. 1 shows a block diagram of the airborne weather radar system made in accordance with the principles of the present invention.

Referring to FIG. 1, there is shown a block diagram of a specific illustrative embodiment of an automatic horizontal and vertical scanning weather radar system for aircraft. Of course, the system could be readily utilized on ships, ground-based stations or the like. The system includes a conventional radar antenna 4 such as a phased array flat plate antenna with fixed frontal gain pattern, all of which is standard. The antenna 4 is mounted, again in a conventional manner, to oscillate back and forth and direct a beam horizontally outwardly, and also to move up and down to direct a beam vertically outwardly.

Figure 2A:
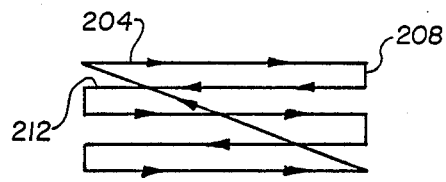
FIGS. 2A and 2B graphically represent exemplary patterns for moving the antenna of the FIG. 1 system.
Figure 2B:
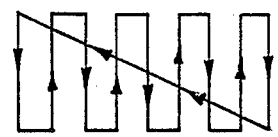

Antenna stepper motors 8 are coupled to the antenna 4 to move and position the antenna in conventional x and y directions of an orthogonal coordinate system. Stepper signals directing the antenna motors 8 to move the antenna 4 in a programmable preselected pattern are supplied by a horizontal drive control circuit 12 and a vertical drive control circuit 16. The horizontal drive control circuit 12 provides the stepper signals to cause the antenna 4 to be moved in the horizontal direction while the vertical drive control circuit 16 supplies the stepper signals to cause the antenna 4 to be moved in the vertical direction. In combination, the two drive control circuits 12 and 16 completely determine the pattern and speed at which the antenna 4 is moved. Two exemplary patterns of movement of the antenna 4 are shown in FIGS. 2A and 2B. In the FIG. 2A pattern, the antenna 4 is first caused to move horizontally (as indicated by line trace 204), then vertically downwardly (as indicated by line trace 208), then again horizontally, but in the direction opposite the first horizontal movement (line trace 212), etc., in a raster scan pattern. In the FIG. 2B pattern, the antenna 4 is first caused to move downwardly, then horizontally to the right, then upwardly, etc., in a square wave pattern as shown. It should also be noted that the horizontal drive control circuit 12 and vertical drive control circuit 16 respond to signals from a stabilization circuit 70 (to be discussed later) for correcting the position of the antenna 4 to compensate for pitch and roll of the aircraft.

A standard microwave generator, such as a magnetron 20, supplies transmit signals to the antenna 4 to cause it to produce the radar signals (consisting of narrow pulses of high-frequency wave). The antenna 4 is used both for transmitting radar signals and for receiving reflected radar signals. A transmit/receive switch 24 is provided to allow the flow of electrical signals from the antenna to receiver circuitry 28 when the antenna is in the receive phase, but to block the flow of such electrical signals when the antenna is in the transmit phase. This protects the receiver circuitry 28 from transmission energy that might otherwise flow to the receiver circuitry causing damage.

The receiver circuitry 28 includes a mixer 32 which converts the high frequency return signals to lower frequency signals suitable for processing. A local oscillator 36 supplies an oscillatory signal of a certain frequency to the mixer 32 which produces an intermediate frequency (IF) signal from the oscillator signal and the incoming return signals. The frequency of the oscillator signal is adjusted by an IF receiver 40 to maintain the desired frequency of the IF signal. The IF receiver 40 amplifies the IF signal received from the mixer 32 and supplies the amplified signal to a digitizing filter 44. The digitizing filter 44 converts the received analog signal into a digital signal, typically two or three bits in length, and filters the digital signal for transfer to the next stage of the system.

A digital STC (Sensitivity Time Control) correction processor and logic unit 48 is a conventional circuit package for receiving digital return data from the digitizing filter 44 and adjusting the intensity of the data to compensate for differing distances from which the radar return data is received (since near return data is more intense than for distant return data). This is a well-known process. The compensated data, including distance information, is then supplied to a central processor 64 which, in turn, supplies it to a special purpose processor 80 for storage in a three-dimensional random access memory 84.

The central processor (conventional microprocessor) 64 controls and coordinates the operations of the other circuits and units of the radar system of FIG. 1, including a display RAM 52, a display counter 68, and a stabilization circuit 70. The display RAM 52 is a two-dimensional random access memory in which the central processor 64 stores the picture image data (prepared by the special purpose processor 80 as will be discussed momentarily) to be displayed on a cathode ray tube (CRT) 56. This data is supplied to a sweep circuit 60 which, in response to the data, produces scan signals for application to the CRT 56. Return data is supplied to the display RAM 52 to addresses determined by the special purpose processor 80 and identified and conditioned for storage by the display counter 68. The display counter 68 also addresses the display RAM 52 to refresh the CRT 56 and generates the horizontal and vertical retrace trigger signals. Again, such display procedure is known in the radar and video display system art.

The stabilization circuit 70 comprises a microprocessor-based sub-system which monitors signals from a pitch and roll circuit 72 coupled to a conventional gyroscope 76, and supplies control signals to the horizontal and vertical drive control units 12 and 16. These units, in turn, generate compensating stepper signals for positioning the antenna 4 to account for any irregular movement of the aircraft, which movement would be detected by the gyroscope 76. The control units 12 and 16, as earlier indicated, control the initial positioning and subsequent movement (and speed of movement) of the antenna 4, all under control of the central processor 64. The stabilization circuit 70, pitch and roll circuit 72 and gyroscope 76 are of conventional design and operation.

The special purpose processor 80 is programmed to receive and store in the three-dimensional memory 84 all digital radar return data, including distance information, obtained from the antenna 4 sweeping horizontally in the different sweep planes (different antenna tilt angles). As return data is received and digitized from each sweep plane, it is supplied by the central processor 64 to the special purpose processor 80 which updates the old data for that sweep plane in the memory 84. The memory 84 includes a three-dimensional array of addresses, each for storing data representing a different voxel (volume element) in space from which the corresponding radar return data was received. The location of the voxel in space and thus the address in the memory 84 for storing data representing the voxel is determined from distance information and antenna 4 position.

From the stored radar data, the special purpose processor 80 constructs the two dimensional display data to be stored in the two-dimensional display RAM 52 and ultimately displayed on the cathode ray tube 56. This two-dimensional display includes a horizontal, plan view image (conventional) along with either a vertical front view image or a vertical, side view image of the weather condition being scanned. Advantageously, the vertical front view (if the vertical front view is the vertical view to be shown) is positioned above the horizontal, plan view, on the display (cathode ray tube 56), as illustrated in FIG. 3 at 104 and 108 respectively.

Figure 3:
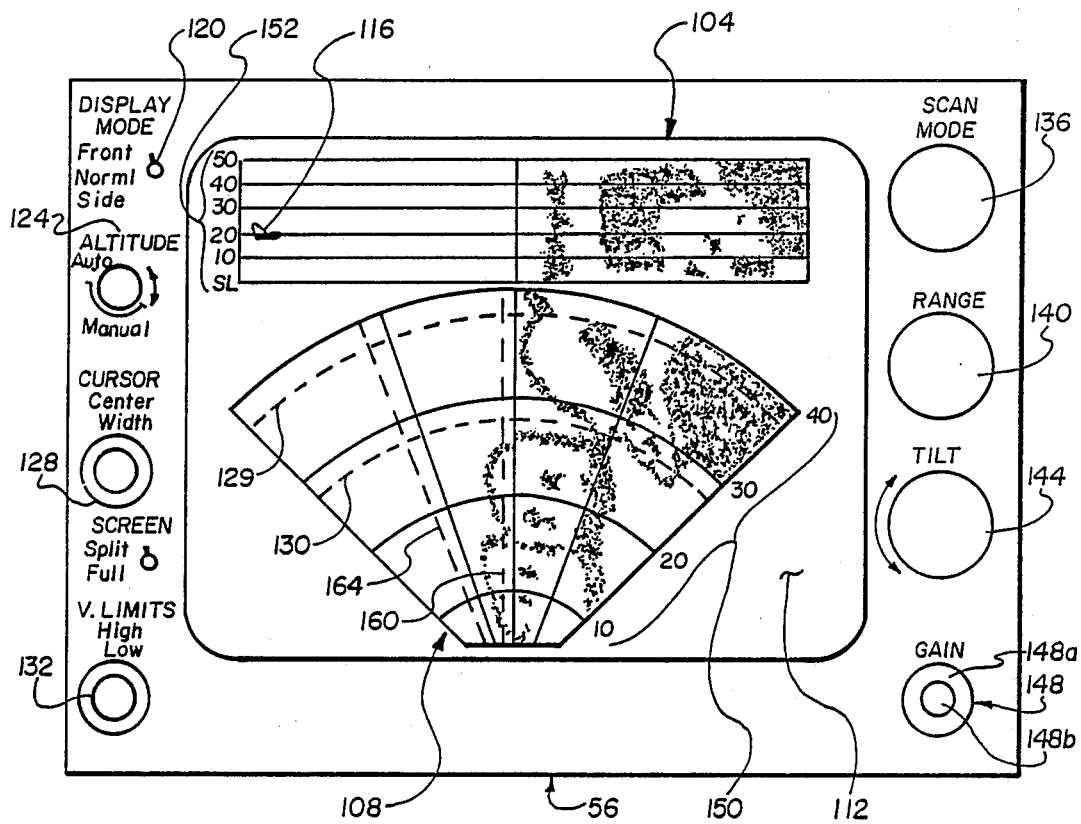
FIG. 3 shows a front view of the cathode ray tube display, also made in accordance with the principles of the present invention.
Figure 4:
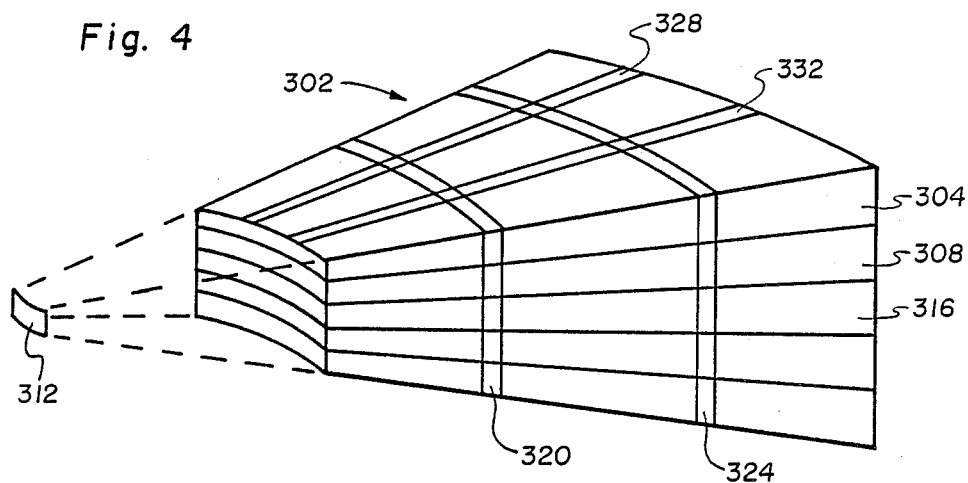
FIG. 4 is a graphic representation of an exemplary region in front of an aircraft scanned by a radar system of the present invention.

FIG. 3 is a front view representation of the cathode ray tube 56 showing a display area screen 112 on which the radar images are displayed. As already indicated, a horizontal plan view image is shown displayed at 108 and a vertical front view image is shown displayed at 104. With these displays, a pilot flying towards a weather condition can determine the range or distance of the condition (from the plan view image 108 and distance indicia 150 produced by the cathode ray tube 56 from stored distance information) and the altitude of the condition (from the vertical front view image 104 and altitude indicia 152 produced on the screen from stored altitude information [to be discussed momentarily]). This would facilitate selection by the pilot of the best route through the weather condition to avoid individual storm cells—since the weather is displayed so that the pilot can perceive at a glance, heights as well as intensities of storm cells FIG. 4 is a graphic representation of two of the scanning patterns through which the antenna 4 might advantageously sweep, and from which return information is received and stored in memory 84. For example, the antenna 4 might first direct a radar beam to sweep through the topmost plane 304 of FIG. 4, and then drop down to plane 308 and sweep back in the opposite direction, etc. The planes are shown emanating from an antenna 312. Since the memory 84 (FIG. 1) stores radar data of all of the sweeps of the antenna, i.e., data representing the weather conditions inside the entire volume of the scanned region 302 of FIG. 4, two dimensional displays or images may be produced for any "slice" of the volume. Of course, for the horizontal plan view image, stored data in horizontal slice 304, 308, 316, or any other horizontal slice may be used to produce the desired two dimensional image for ultimate display on the cathode ray tube 56. Similarly, for production of the vertical, front view image data contained in slices such as slice 320 or 324 may be used to produce the corresponding two dimensional image. (These slices would have been corrected for distance and height distortion prior to storage of the return data in memory 84.) The particular slice desired is simply determined by what range or distance from the aircraft the pilot desires for the front view image. If it is desired to display a vertical, side view image rather than a front view image, then vertical slices such as 328 or 332 from the volume 302 could be selected and displayed on the screen 112 (FIG. 3) in place of image 104.

Although only two scanning patterns are shown, it will be apparent that other patterns could also be devised; and variations of the patterns shown in FIGS. 2A and 2B could also be utilized.

To produce a particular two dimensional display, the special purpose processor 80 (FIG. 1) selects data from the memory 84 corresponding to the selected two dimensional slice to be displayed, formats such data, and passes it to the central processor 64 which, in turn, supplies it to the display RAM 52. For example, if the horizontal plan view image to be displayed is that corresponding to slice 304, then the data in memory 84 which corresponds to the radar return data stored for that slice is retrieved and formatted in a two dimensional array which will occupy the lower approximately ⅔ of the screen 112 (FIG. 3). Similarly, if slice 324 is the front view image to be displayed, then the special purpose processor 80 retrieves data from memory 84 stored at locations corresponding to slice 324, formats such data into a two dimensional image, along with the previously formatted two dimensional image for the horizontal plan view, so that the front view image will occupy the top approximately ⅓ of the screen 112. This composite two dimensional array of data for both the horizontal plan view slice 304 and the front view slice 324 would then be delivered to the central processor 64 for ultimate delivery and storage in the display RAM 52. The sweep circuit 60 would then produce an image on the cathode ray tube 56 in accordance with the two dimensional array of data stored in the display RAM 52 to thereby produce the desired composite images.

Reformatting digitized visual images to enable display of views or planes of the image other than just the plane of acquisition of the data, i.e., front view, is well known. See, for example, Peters, T. M., "Multi-planar Transformation of CT Images", *Journal De L'Association Canadienne Des Radiologistes*, Vol: 31, pp. 126-128, 1980; and Glenn, W. V. et al, "Image Generation and Display Techniques for CT Scan Data: Thin Transverse and Reconstructed Coronal and Sagital Planes", *Investigative Radiology*, September-October, 1975, pp. 403-416.

In addition to selecting for display different "slices" of data from the volume of the scanned region 302 (FIG. 4), the thickness of the "slices" to be displayed may also be selected. For example, referring to FIG. 3, cursor lines 160 and 164 are used to select both the particular vertical side view slice to be displayed (assuming it is the vertical, side view rather than the vertical, front view which is to be displayed) and the thickness of the slice. Upon setting the location and width of the cursor line 160 and 164 using dual control knob 128, the stored data representing radar returns within the cursor lines is integrated and formatted for display as earlier described. The vertical front view slice of data to be displayed, and the width thereof, could likewise be selected using cursor lines 129 and 130, controlled again by dual control knob 128. (Control knob 128 controls cursor lines 160 and 164 when a display mode control knob 120 is in the "side" position and cursor lines 129 and 130 when the control knob 120 is in the "front" position.)

The system of FIG. 1 also includes provision for receiving the output from an encoding altimeter 86 for determining the altitude of the aircraft (above sea level) carrying the radar system. The altimeter provides readings of the altitude of the aircraft and supplies those readings to the special purpose processor 80 which, in turn, stores the readings and produces for display data representing the image of an aircraft and actual elevation of the weather pattern to be displayed on whatever vertical display is to be presented on the screen 112 (FIG. 3). Such an aircraft image is shown at 116 toward the left hand side of the front view image display 104, with the weather image 104 being displayed on the right hand side. These images, which are displayed automatically from altitude information received by the altimeter 86, enables the pilot to readily determine his elevation relative to a weather condition into which he is flying as well as the vertical extent of the weather condition above sea level.

The system of FIG. 1 also includes a number of manual controls (two of which have already been discussed) to enable selection of the data to be displayed on the cathode ray tube 56. These controls include the display mode control 120, an altitude input control 124, the cursor control 128, a vertical limits control 132, a scan mode control 136, a range control 140, a tilt angle control 144, and a gain control 148. These controls, in the form of rotatable knobs, are located on the display unit 56 (FIG. 2) although the information and control signals developed by the controls are supplied to the special purpose processor 80.

The display mode control 120 (FIG. 2) allows the pilot to select any one of three images or combination of images to be displayed. When the control knob 120 is in the "normal" position, then the special purpose processor 80 is signaled to display the normal horizontal, plan view image of the weather condition, taking up the entire screen 112. When the display mode control 120 is in the "front" position, then the special purpose processor is signaled to display both the horizontal, plan view image and the vertical, front view image, as illustrated in FIG. 3. When the display mode control 120 is in the "side" position, then the images displayed are the horizontal, plan view and the vertical, side view. Of course other display modes with different combinations of views could be provided if desired.

The altitude control 124 allows for manually positioning the aircraft outline (carat) 116 at any desired location. This would be done after reading the aircraft's altimeter and then simply positioning the aircraft outline 116 at the altitude indicated. Altitude designations are produced on the screen 112 at 152, to the side of the front view image 104, from altitude readings automatically produced by the encoding altimeter 86. The altitude control 124 also includes a position to allow automatic location of the aircraft outline 116 on the front of view image.

As indicated earlier, the cursor control 128 allows the pilot to select the vertical, front region, or vertical, side region from which radar returns will be displayed by positioning the cursor lines 129 and 130 or cursor lines 160 and 164 respectively.

The vertical limits control 132 limits the upper and lower excursions of the antenna tilt to the region of interest. That is, this control determines the vertical height over which the antenna will scan. In this manner, no scanning of unimportant regions will be done and this will permit a faster repetition rate of the scan cycles.

The controls 136, 140, 144 and 148 are all standard features of a conventional aircraft radar system. Control 136 allows the pilot to select the scan mode for the cathode ray tube 56, i.e., stand-by, test, weather (the mode of interest here) or terrain mapping (antenna 4 tilted downwardly to obtain image of the terrain below). Control 140 is used to select the range (distance ahead) to be displayed in the top plan view display 108. Long distances, such as 200 miles, may be selected to supply a general, non-detailed view of major storms ahead, or shorter distances, such as 30 or 40 miles, may be chosen to give a more detailed view of a storm. Control 144 allows for manually positioning the tilt of the antenna 4 when control 120 is in the "normal" scan mode. Finally, control 148 (which consists of two knobs 148a and 148b) is an amplifier gain control function and a brightness/intensity control function of the images displayed on the screen 112.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements

What is claimed is:

1. An automatic horizontal and vertical scanning weather radar system for a transmitting and receiving station comprising antenna means mounted in the station for receiving reflected radar signals and responsive to a transmit signal for producing and directing outwardly therefrom a radar beam, and responsive both to horizontal drive signals for sweeping the radar beam back and forth horizontally, and to vertical drive signals for moving the radar beam up and down vertically, means for periodically supplying transmit signals to the antenna means, receiver means coupled to the antenna means for digitizing reflected radar signals received by the antenna means, means for storing the digitized signals, display means responsive to the digitized signals for displaying both a plan view image of weather over a preselected horizontal range represented by reflected radar signals received by the antenna means sweeping back and forth horizontally, and a vertical view image of weather for a preselected height range represented by reflected radar signals received by the antenna means moving up and down vertically, and control means for supplying horizontal drive signals and vertical drive signals to the antenna means, and for retrieving digitized signals from the storing means and supplying them to the display means.

2. A system as in claim 1 wherein said antenna means comprises an antenna for receiving reflected radar signals, and responsive to the transmit signals for transmitting a radar beam, a motor responsive to horizontal drive signals for causing the antenna to move back and forth horizontally, and to vertical drive signals for causing the antenna to move up and down vertically, horizontal drive signal means responsive to said control means for supplying horizontal drive signals to the motor, and vertical drive signal means responsive to said control means for supplying vertical drive signals to the motor.

3. A system as in claim 1 wherein said display means comprises a display screen, and means for displaying on the screens in a first area the plan view image and in a second area the vertical view image.

4. A system as in claim 3 wherein said second area is located above said first area on the screen.

5. A system as in claim 3 further comprising altitude means for producing altitude signals indicating the altitude of the station, said control means being responsive to the altitude signals for signaling the display means to produce a cursor on the second area of the screen means at elevations representing the altitude of the station.

6. A system as in claim 5 wherein said control means is responsive to said altitude signals for signaling the display means to produce indicia on the screen means in the second area indicating elevations of various parts of the vertical view image.

7. A system as in claim 3 wherein said control means is responsive to the stored digitized signals for signaling the display means to produce indicia on the screen means in the first area indicating horizontal distances from the station.

8. A system as in claim 2 wherein said horizontal drive means and vertical drive means supply drive signals to the motor to cause the motor to move the antenna horizontally in a first direction, then vertically downwardly, then horizontally further in the first direction, then vertically upwardly, then horizontally again in the first direction, etc. in a repetitious square wave pattern which is successively repeated and which includes both horizontal and vertical sweep components.

9. A system as in claim 2 wherein said horizontal drive means and vertical drive means supply drive signals to the motor to cause the motor to move the antenna horizontally in a first direction, then vertically downwardly, then horizontally in a second direction opposite the first direction, then vertically downwardly, then horizontally in the first direction, etc., in a repetitious raster scan pattern which is successively repeated and which includes both horizontal and vertical sweep components.

10. A system as in claim 2 wherein said horizontal drive means and vertical drive means supply drive signals to the motor to cause the motor to move the antenna horizontally through a certain angle and then vertically through a certain angle, and then successively repeating this sequence of movements.

11. A system as in claim 11 wherein said vertical view image of weather is a front vertical view, looking from the station.

12. A system as in claim 1 wherein said vertical view image of weather is a side vertical view.

13. A method of displaying radar signal returns on a display device in an aircraft comprising
automatically transmitting radar signals forwardly of the aircraft to sweep horizontally through a preselected range and vertically through a preselected range,
receiving and digitizing radar signals reflected back from weather formations, and
displaying on the display device both a plan view image of weather over the preselected horizontal range, and a vertical view image showing the height of weather over the preselected vertical range.

14. A method as in claim 13 further comprising the steps of
displaying on the display device with the vertical view image indicia defining various elevations of the vertical view weather image, and
displaying on the display device with the vertical view image a cursor indicating the altitude of the aircraft.

15. A method as in claim 14 wherein said cursor displaying step comprises
determining the altitude of the aircraft with an altimeter, and
automatically signaling the display device to display the cursor at a location representing the altitude of the aircraft.

16. A method as in claim 14 wherein said cursor displaying step comprises manually signaling the display device to display the cursor at a location determined to be the altitude of the aircraft by the user.

17. A method as in claim 13 wherein said displaying step comprises displaying a front, vertical view image of weather and the plan view image.

18. A method as in claim 13 wherein said displaying step comprises displaying a side, vertical view image of weather and the plan view image.

19. A method as in claim 13 wherein said displaying step comprises displaying the vertical view image above the plan view image on the display device.

20. An automatic horizontal and vertical scanning weather radar system for aircraft comprising
antenna means mounted in the aircraft for receiving reflected radar signals and responsive to a transmit signal for producing and directing outwardly therefrom a radar beam, and responsive both to horizontal drive signals for sweeping the radar beam back and forth horizontally, and to vertical drive signals for moving the radar beam up and down vertically,
means for periodically supplying transmit signals to the antenna means,
receiver means coupled to the antenna means for digitizing reflected radar signals received by the antenna means, and for producing distance information representing distances from the aircraft from which reflected radar signals are received,
altitude means for producing altitude signals indicative of the altitude of the aircraft above sea level,
means for storing the digitized signals, distance information, and altitude signals,
display means responsive to display control signals for displaying a plan view image of weather over a preselected range represented by reflected radar signals received by the antenna means sweeping back and forth horizontally, a vertical view image of weather for a preselected height represented by reflected radar signals received by the antenna means moving u and down vertically, and altitude indicia indicating the altitude of the vertical view image of weather above sea level, and
control means for supplying horizontal drive signals and vertical drive signals to the antenna means, and for producing display control signals from the stored digitized signals, distance information and altitude signals.

* * * * *